US009903611B2

(12) United States Patent
Rubinstein et al.

(10) Patent No.: US 9,903,611 B2
(45) Date of Patent: Feb. 27, 2018

(54) SOLAR SWITCHING SYSTEM

(71) Applicants: Ohad Rubinstein, Nes Ziona (IL); Alon Hanasav, Tel Aviv (IL)

(72) Inventors: Ohad Rubinstein, Nes Ziona (IL); Alon Hanasav, Tel Aviv (IL)

( * ) Notice: Subject to any disclaimer, the term of this patent is extended or adjusted under 35 U.S.C. 154(b) by 560 days.

(21) Appl. No.: 14/158,874

(22) Filed: Jan. 20, 2014

(65) Prior Publication Data
US 2014/0202451 A1 Jul. 24, 2014

(30) Foreign Application Priority Data

Jan. 24, 2013 (IL) .......................... 224404

(51) Int. Cl.
*F24H 9/20* (2006.01)
*F24D 17/00* (2006.01)
*F24D 19/10* (2006.01)

(52) U.S. Cl.
CPC ....... *F24H 9/2007* (2013.01); *F24D 17/0068* (2013.01); *F24D 19/1057* (2013.01); *Y02B 10/20* (2013.01); *Y02B 10/70* (2013.01)

(58) Field of Classification Search
USPC ................. 126/714; 122/14.3, 15.1
See application file for complete search history.

(56) References Cited

U.S. PATENT DOCUMENTS

| 4,237,862 | A | * | 12/1980 | Embree | ..................... F24J 2/402 |
| | | | | | 126/588 |
| 4,308,912 | A | * | 1/1982 | Knecht | ................. C08F 257/02 |
| | | | | | 126/585 |
| 4,644,935 | A | * | 2/1987 | Gallagher | ........... F24D 19/1057 |
| | | | | | 126/588 |
| 4,693,089 | A | * | 9/1987 | Bourne | ..................... F24D 3/08 |
| | | | | | 62/238.6 |

(Continued)

FOREIGN PATENT DOCUMENTS

JP 60142159 A * 7/1985 ............. F24D 17/02
WO 2000/058668 10/2000

(Continued)

OTHER PUBLICATIONS

Check valve, https://en.wikipedia.org/wiki/Check_valve, visited Nov. 7, 2016.

*Primary Examiner* — Avinash Savani
(74) *Attorney, Agent, or Firm* — The Law Office of Joseph L. Felber

(57) ABSTRACT

A method and a control system for a hot water supply system, wherein the hot water supply system includes at least one boiler having a heating fluid input pipe line, the control system comprising: a motorized valve; installed upon the heating fluid input pipe line; a first thermistor installed upon the heating fluid input pipe line; a second thermistor installed within the boiler; a motor mechanically connected to the motorized valve; and a controller, wherein the controller is adapted for opening and closing the motor- (Continued)

ized valve according to temperature difference between a temperature measurement by the first thermistor and a temperature measurement by the second thermistor, wherein the controller is electrically connected to the motor, to the first thermistor, and to the second thermistor.

6 Claims, 7 Drawing Sheets

(56) References Cited

U.S. PATENT DOCUMENTS

| | | | | |
|---|---|---|---|---|
| 4,930,492 | A * | 6/1990 | Rich | F24D 17/0021 126/588 |
| 6,125,873 | A * | 10/2000 | Brown | E03B 7/12 137/62 |
| 6,625,029 | B2 * | 9/2003 | Bernini | G01L 19/0092 361/715 |
| 2005/0022542 | A1 * | 2/2005 | Sakakibara | F24D 19/1054 62/183 |
| 2009/0314484 | A1 * | 12/2009 | Barrett | G05D 23/192 165/293 |
| 2010/0319378 | A1 * | 12/2010 | Chikami | F24D 3/082 62/238.7 |
| 2014/0137851 | A1 * | 5/2014 | Branecky | F24D 12/02 126/80 |
| 2015/0107581 | A1 * | 4/2015 | Lin | E04H 4/129 126/621 |
| 2015/0226460 | A1 * | 8/2015 | Zemach | F24D 17/0021 700/90 |
| 2015/0285690 | A1 * | 10/2015 | van Houten | G01K 7/16 374/103 |
| 2016/0109156 | A1 * | 4/2016 | Yin | B21C 37/151 122/15.1 |
| 2016/0161148 | A1 * | 6/2016 | Honeycutt | F24D 19/1021 122/14.3 |
| 2016/0187028 | A1 * | 6/2016 | Shimada | F24H 9/2035 122/14.21 |

FOREIGN PATENT DOCUMENTS

| | | | |
|---|---|---|---|
| WO | 2010/143185 | 12/2010 | |
| WO | WO 2010143185 A1 * | 12/2010 | ............ F24D 11/003 |

* cited by examiner

SOLAR SWITCHING SYSTEM

REFERENCE TO CROSS-RELATED APPLICATION

This application claims priority from Israeli Patent Application No. 224404, filed Jan. 24, 2013, which is hereby incorporated by reference in its entirety.

FIELD OF THE INVENTION

The present invention relates to solar switching systems, more particularly, to homely heat exchange switching system of hot water supply solar systems.

BACKGROUND OF THE INVENTION

Many homes around the world use solar systems for the supply of hot water. For example, in Israel there are estimated to be more than two million such systems.

In Israel, installing such a solar water heating system in the home is required in building codes and regulations. According to the law, any building less than ten floors high must include a solar water heating system.

In Israel, there are two main types of domestic solar water heating systems:

An open system:

In such a system, each apartment has an independent solar unit, in which the water is heated for the apartment. Cold water enters a solar panel, where it is heated by the heat of the sun, and then it is conveyed to a hot water tank. This system is highly efficient and is in use in private homes and apartment buildings less than four floors tall.

A closed system, including a heat exchanger:

In high-rise apartment buildings, there is not enough roof space to provide each apartment with an independent solar unit. In order to meet the requirement of Israeli law, a common solar system was developed for apartment buildings.

FIG. 1 of the prior art is a side view schematic illustration of a hot water supply system 2 installed in a multi unit apartment building 1.

FIG. 2 of the prior art is a side view exploded schematic illustration of a hot water supply system 2.

The hot water supply system 2 also includes a heat exchange solar system 3, which includes a solar panel 11, (or solar panels), from which hot water flow through a hot heating fluid pipe line 12.

From the hot heating fluid pipe line 12, one heating fluid input pipe line 13 branches out for each internal heat-exchanger 14.

In the course of the flow of the heating fluid (not shown in the illustrations), heat is exchanged, the water 22 in the boiler 21 is heated, while the heating fluid is cooled.

From each internal heat-exchanger 14, heating fluid flows in a heating fluid output pipe line 15 and onward returns to the solar panel 11 through a cold heating fluid pipe line 16.

Often, the heat exchange solar system includes a pump 17, which facilitates the flow of the heating fluid. Pump 17 is active when the heating fluid at the top part of the solar panel 11 is hotter than the heating fluid at the bottom part of the solar panel 11 (namely, solar heating is taking place). When this condition is not in place, pump 17 ceases action, and the heating fluid flows according to the laws of connected vessels and preservation of energy.

Water 22 is provided at a sufficiently high pressure for each boiler 21 through a cold water pipe line 23.

Water 22 from a boiler 21 is provided for use through a hot water pipe line 24 when a faucet 25 is opened. When the hot water supply system 2 cannot supply water 22 at a sufficiently hot temperature, every apartment unit can heat the water 22 in its separate boiler 21 by activating an electrical heater 26.

The hot water supply system 2 has a major disadvantage of heat loss through the internal heat-exchangers 14. There are cases in which a tenant activates an electrical heater 26, the water 22 is heated, and if the temperature of the water heated electrically is higher than that of the heating fluid, there is a negative exchange of heat, namely heat from the water 22 is transferred to the heating fluid.

An additional disadvantage is natural heat loss at sunset and after the hot water supply system 2 heated the water 22 in each boiler 21 throughout the day by means of solar energy. A slow process of heat loss from each boiler 21 to the hot water supply system 2 occurs even when pump 17 is inactive.

The slow process is caused by physical action of the laws of connected vessels and energy preservation. There is movement of the water 22 even without activation of the pump 17. Water 22 that is hotter in some of the apartments in the building will flow to apartments in which the water 22 is colder, causing eventual heat loss for all apartments in the building. Namely, the cumulative effect is that the water 22 in each boiler 21 cools over the night.

An additional disadvantage is a result of the method of activation of the pump 17. The pump 17 is activated based upon measurement of a maximum point of the heat exchange solar system 3. Following this principle, it could also act when there is no effective heat from the solar panel 11, for example on a cloudy day, the activation equation for the pump 17 can apply (the heating fluid at the top part of the solar panel 11 is hotter than the heating fluid at its bottom), however, there will not be effective heating of water 22 in reasonable quantities for the entire building. In this case, heat generated by the tenants of the building by means of each boiler 21 will quickly be transferred into the hot water supply system 2 and impair the efficiency of the apartment heating, while wasting energy resources and tenants' money.

There is therefore a need for a new solution to overcome the present disadvantages of the existing hot water supply system 2.

BRIEF SUMMARY EMBODIMENTS OF THE INVENTION

The background art does not teach or suggest a solution which enables overcoming the existent disadvantages of the existing hot water supply system, described in the previous segment of the present patent application.

The present invention overcomes these deficiencies of the background art by providing a control system for each apartment, which can be automatically activated as a hot water supply system.

The control system is designated to perform measurement of the temperature of the heating fluid on the incoming line into the apartment boiler and compare it to the temperature of the water within the boiler. When the control system finds that the water within the boiler is warmer than the heating fluid, it activates a motorized valve that disconnects the boiler from the heat exchange solar system, or in other words prevents the possible flow of heating fluid in the internal heat-exchanger within the boiler.

When the situation is the other way around (namely the heating fluid is warmer than the water within the boiler), the control system activates the motorized valve and enables flow of heating fluid in the internal heat-exchanger within the boiler.

Thus, the control system removes the existent disadvantages of hot water supply systems working as closed systems, and will result in significant conservation of energy (electric and thermal) by optimal use of the heat generated in the solar system, and prevention of heat loss.

According to the present invention there is provided a control system for a hot water supply system, wherein the hot water supply system includes at least one boiler having a heating fluid input pipe line, the control system including: a motorized valve; installed upon the heating fluid input pipe line; a first thermistor installed upon the heating fluid input pipe line; a second thermistor installed within the boiler; a motor mechanically connected to the motorized valve, and a controller adapted for opening and closing the motorized valve according to temperatures difference between a temperature measurement by the first thermistor and a temperature measurement by the second thermistor, wherein the controller is electrically connected to the motor, to the first thermistor, and to the second thermistor, and wherein the second thermistor is located inside a thermostat housing.

According to still further features of the present invention the controller is controller is connected to the motor by a control line, to the first thermistor by a first thermistor feedback line, and to the second thermistor by a second thermistor feedback line.

According to still further features of the present invention the control system further includes: a battery, wherein the battery is electrically connected to the controller.

According to still further features of the present invention the control system further includes: an indicator, wherein the indicator is electrically connected to the controller.

According to still further features of the present invention the control system is adapted to prevent any flow through an internal heat-exchanger which is located inside said boiler.

According to still further features of the present invention the control system includes no motorized valve bypass.

According to still further features of the present invention the control system includes no means for transmitting a signal to indicate a state of a private heating switch.

According to the present invention there is provided a method of operation of a controller of a control system for a hot water supply system, the method including: starting up the controller; checking a battery level of the controller; if the battery level is below a pre-defined low level value, the control system, causing a low battery indicator to blink; checking whether a first thermistor and a second thermistor of the control system is functioning correctly; activating an indicator to blink, in case of a malfunction of the first thermistor; and activating an indicator to blink, in case of a malfunction the second thermistor.

According to another features of the present invention of the present invention the method further includes: putting the control system to a sleep mode, for a predetermined period of time.

According to still further features of the present invention the method further includes: checking whether a temperature measured by the first thermistor is higher than a temperature measured by the second thermistor; opening a motorized valve of the control system if the temperature measured by the first thermistor is higher than the temperature measured by the second thermistor; and closing the motorized valve of the control system if the temperature measured by the first thermistor is lower than the temperature measured by the second thermistor.

According to still further features of the present invention the method further including: starting a closing process; checking whether a predetermined amount of time has passed since starting the closing process; and stopping providing voltage to a motor of the motorized valve, if predetermined amount of time has passed since starting the closing process.

According to still further features of the present invention the method further includes: starting an opening process; checking whether a predetermined amount of time has passed since starting the opening process; and providing voltage to a motor of the motorized valve, if predetermined amount of time has passed since starting the opening process.

Additional objects and advantages of the invention will be set forth in part in the description which follows and, in part, will be obvious from the description, or may be learned by practice of the invention.

BRIEF DESCRIPTION OF THE DRAWINGS

The invention is herein described, by way of example only, with reference to the accompanying drawings, wherein.

Figure 1:
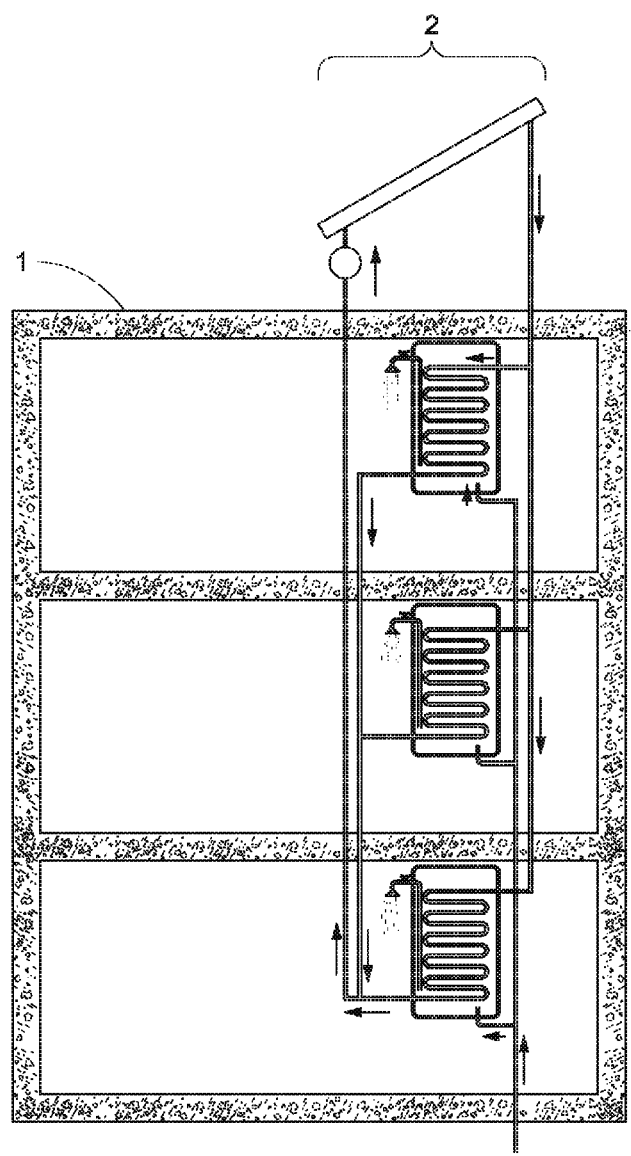
FIG. 1 of the prior art is a side view schematic illustration of a hot water supply system installed in a multi unit apartment building.
Figure 2:
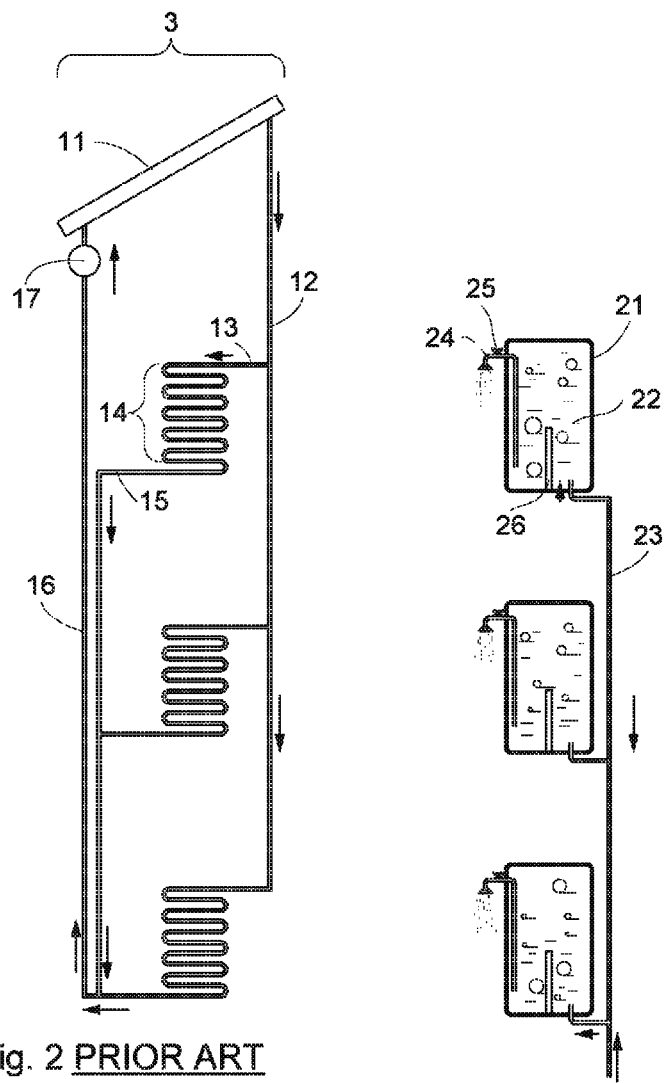
FIG. 2 of the prior art is a side view exploded schematic illustration of a hot water supply system.

In order to leave no room for doubt, the elements shown in the illustrations of the present patent application in a manner that enables understanding them clearly, and the scales, size relations, and shapes are not in any way limiting their embodiment.

DETAILED DESCRIPTION OF EMBODIMENTS OF THE INVENTION

To remove any doubt, note that the manner in which the elements of the present invention are described in the illustrations can be highly detailed, however is not in any way limiting the present invention, however is for the purpose of clarification and furthering understanding. The present invention can be implemented in embodiments that differ from the specification given with regard to the illustration. The present invention is of a control system for a hot water supply systems.

The principles and operation of a control system for a hot water supply systems according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

The following list is a legend of the numbering of the application illustrations:

1 multi unit apartment building
2 hot water supply system
3 heat exchange solar system
11s solar panel
12 hot heating fluid pipe line
13 heating fluid input pipe line
14 internal heat-exchanger
15 heating fluid output pipe line
16 cold heating fluid pipe line
17 pump
21 boiler
22 water
23 cold water pipe line
24 hot water pipe line
25 faucet
26 electrical heater
31 motorized valve
31a motor
32 first thermistor
33 second thermistor
40 control system
41 controller
42 battery
43 indicator, (such as LED)
44 first limit switch, (built in the motorized valve)
45 second limit switch, (built in the motorized valve)
47 switch
51 control line
52 first thermistor feedback line
53 second thermistor feedback line
54 mechanical link
71 heating fluid
72 thermostat
73 thermostat housing
73a thermostat housing base end
73b thermostat housing top end Hereinafter, embodiments of the present invention are explained in detail by referring to the drawings.

Figure 3:
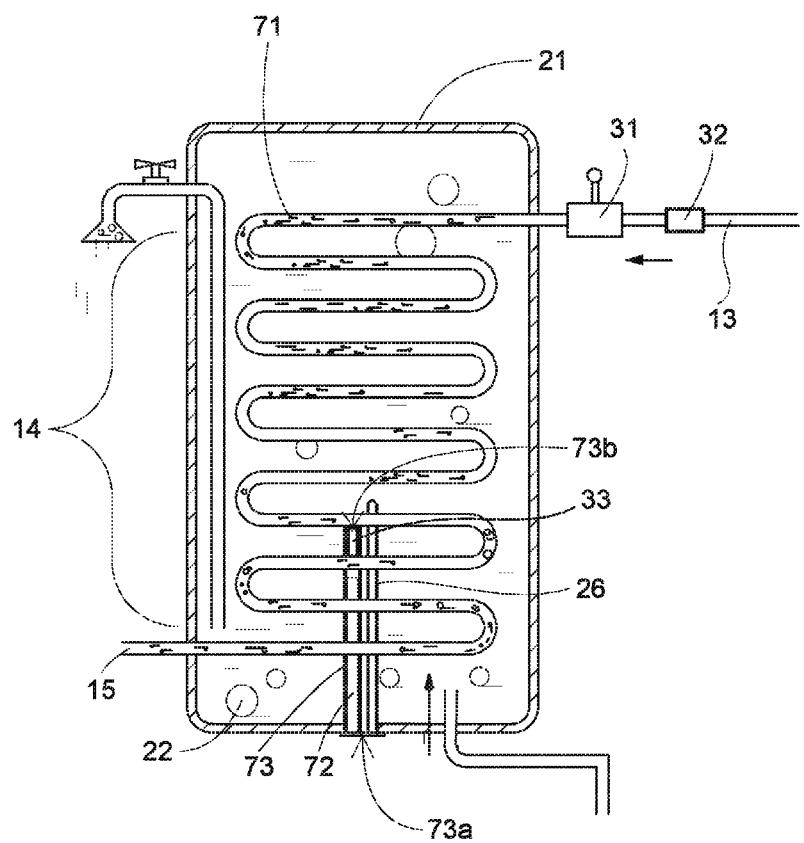
FIG. 3 is a side view schematic illustration of a motorized valve and a first thermistor, installed upon a heating fluid input pipe line of a boiler and of a second thermistor, installed within the boiler, in accordance with an embodiment of the present invention.

FIG. 3 is a side view schematic illustration of a motorized valve 31 and a first thermistor 32, installed upon a heating fluid input pipe line 13 of a boiler 21 and of a second thermistor 33, installed within the boiler 21, in accordance with an embodiment of the present invention.

Boiler 21 is one of several boilers 21 of a hot water supply system acting as a closed solar system.

According to comparison of the temperature measured by the first thermistor 32 with the temperature measured by the second thermistor 33, it is determined when the motorized valve 31 is in a closed state and when it is in an open state, thus enabling or preventing the flow of heating fluid through the internal heat-exchanger 14, respectively enabling the transfer of heat from the heating fluid to the water 22 and preventing the transfer of heat from the water 22 to the heating fluid.

Furthermore, the present illustration shown electrical heater 26.

It is standard for boiler 21 to be equipped with a thermostat 72 when it is disposed within a thermostat housing 73, which isolates it from the water 22. The thermostat housing 73 has a thermostat housing base end 73a and a thermostat housing top end 73b.

Even though according to the present invention, the position of the second thermistor 33 inside boiler 21 is in no way limited, the optimal position was found to be within the thermostat housing 73, between the thermostat 72 and the thermostat housing top end 73b.

Usually, the temperature of the water 22 inside the boiler 21 is not uniform. The first thermistor 32 practically measures a sufficient approximation of the temperature of the heating fluid 71 at the entrance to boiler 21, even though it is not in direct contact with the heating fluid 71. Likewise, the second thermistor 33 also measures only an approximation of the temperature of the water 22 inside the boiler 21, similar to the measurement of the temperature by means of the thermostat 72.

Testing has shown the precision of these measurements to be sufficient for efficient action of the control system 40 (not shown in the present drawing).

According to the present invention, when the motorized valve 31 is in a closed state, there is no flow of heating fluid 71 through the internal heat-exchanger 14. On the heating fluid input pipe line 13, there is no device serving as a bypass line to the motorized valve 31. Likewise, there is no need according to the present invention to measure the temperature of the heating fluid 71 at the exit from the boiler, therefore there is no need for a thermistor upon the heating fluid output pipe line 15.

Furthermore, it is important to note that the control system for a hot water supply system, according to the present invention, is not dependent upon the state of the private heating switch, and therefore does not include an electric wire, or any other means, for transmitting a signal to indicate its state.

Figure 4:
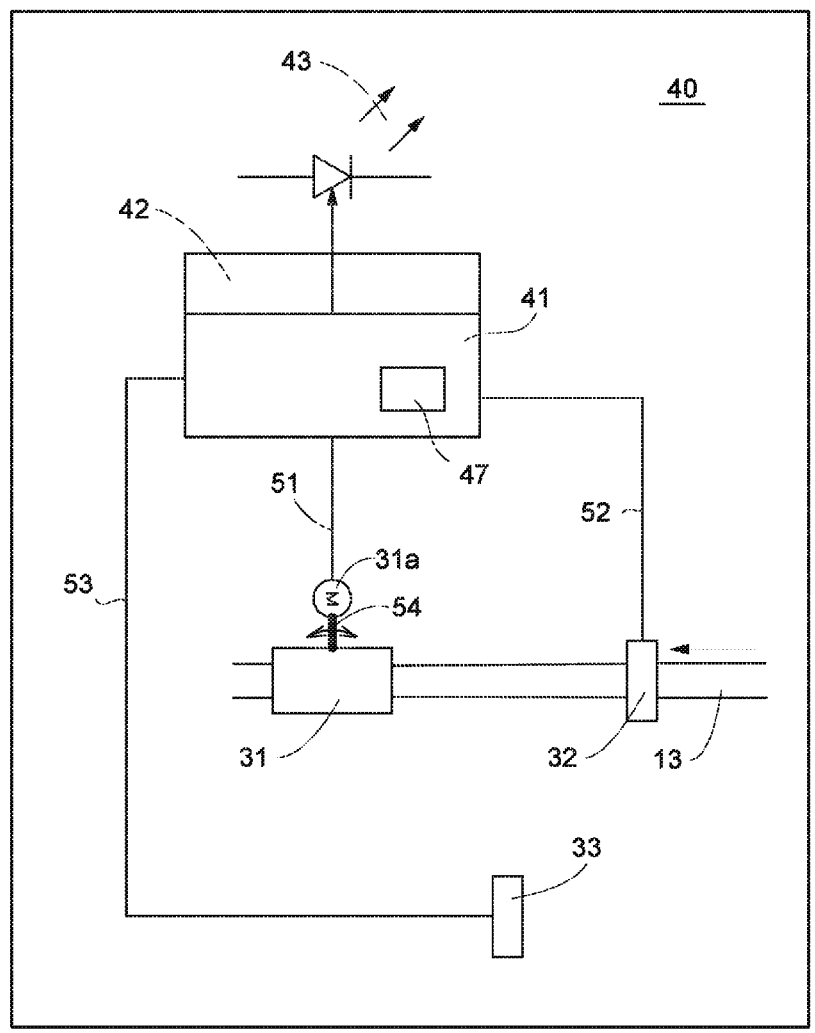
FIG. 4 is a schematic block diagram of a control system according to the present invention.

FIG. 4 is a schematic block diagram of a control system 40 according to the present invention.

The control system 40 includes among other things: a heating fluid input pipe line 13, a motorized valve 31, a first thermistor 32, a second thermistor 33, a controller 41 and a battery 42, and a switch 47.

Heating fluid flows through the heating fluid input pipe line 13 up to the motorized valve 31. The first thermistor 32 senses the heating fluid's temperature and inputs the measured value to the controller 41 through a first thermistor feedback line 52.

The second thermistor 33, located inside the boiler 21 (not shown in the present figure) senses the temperature of the water 22 (not shown in the present figure) inside the boiler 21 and inputs the measured value to the controller 41 through a second thermistor feedback line 53.

The controller 41 compares the values measured by the first thermistor 32 and the second thermistor 33 and according to pre-defined limits sends a command to the motor 31a to open or close the motorized valve 31 through the motor control line 51.

The motor 31a is mechanically connected to the valve 31 by means of a mechanical link 54.

The control system 40 may include one or more indicators 43 (such as a light emitting diode—LED) which can be used to indicate various states of the controller such as normal operation, error statuses etc.

Energy is provided to the entire control system 40 from the battery 42.

The switch 47 is used to set the system mode. System modes can be open, closed and automatic etc.

Figure 5:
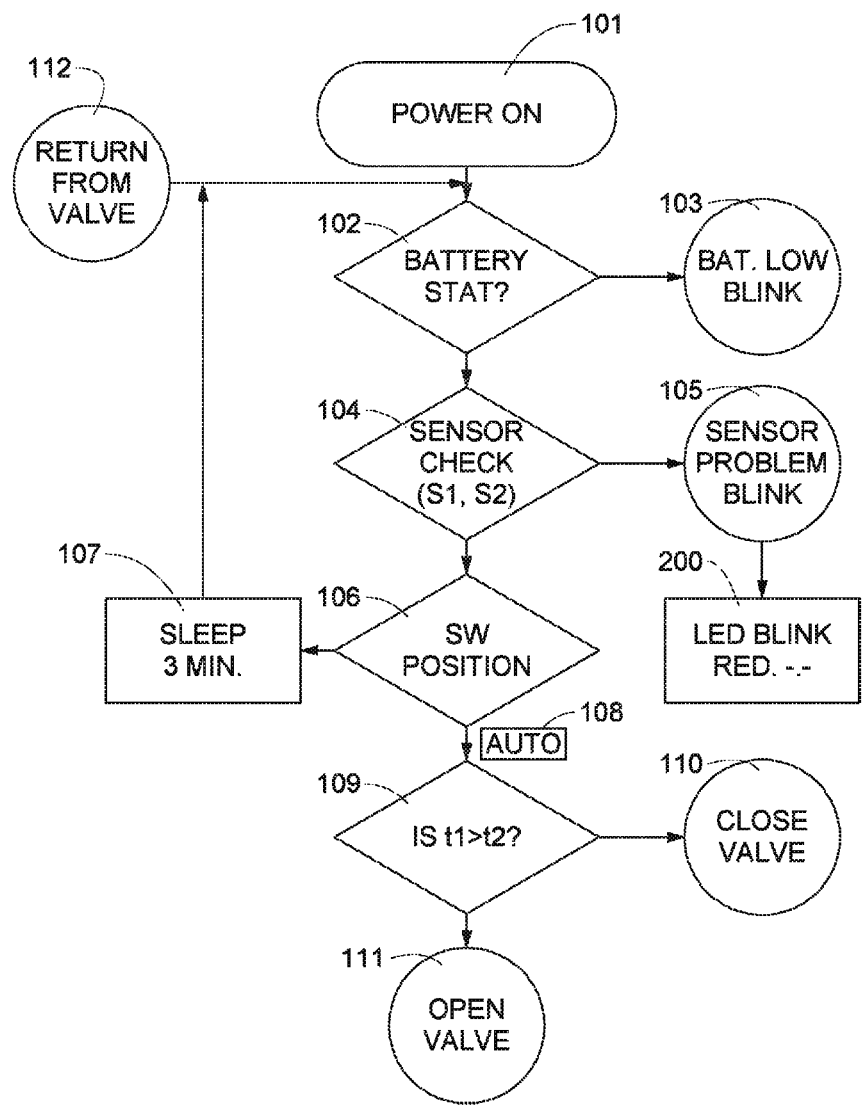
FIG. 5 is a flow chart that schematically illustrates the method of operation of the controller.

FIG. 5 is a flow chart that schematically illustrates the method of operation of the controller 41.

Upon starting up the controller 41 starts in the "power on" state 101. Next the controller 41 moves to the "battery stat?" stage 102 where the status of the battery is checked. If the battery level has gone below a pre-defined low level the control system causes the "low battery" indicator to blink 103.

Next, the controller 41 moves to the "sensor check" stage 104 in which the control system checks whether the two sensors (first thermistor 32 and second thermistor 33) function correctly. In case of sensor malfunction, the controller 41 causes the "sensor problem blink" stage 105 and the "LED blink red" stage 200 in which the "sensor problem" indicator is activated to blink.

Next, the control system 40 checks the switch 47 state, stage 106. If the switch 47 is in the "on" position, the control system 40 goes to a "sleep" mode 107 for a predetermined period of time, such as 3 minutes and then returns to the "battery stat?" stage 102.

If the switch 47 is in the "auto" mode 108, the controller 41 moves to check stage 109, whether the temperature measured by the first thermistor 32 (t1) is higher than the temperature measured by the second thermistor 33 (t2). In case that t1>t2, the controller 41 will open the motorized valve 31, (open valve stage 111), to allow water from the heat exchange solar system 3 to flow into the heating fluid input pipe line 13 thereby, heating the water 22 inside the boiler 21. In case t1<t2, the controller 41 closes the motorized valve 31, (close valve stage 110), and effectively disconnects the boiler 21 from the heat exchange solar system 3.

Next, the controller 41 returns to the "battery stat?" stage 102 and so forth.

Once the controller 41 finishes either the "close valve" stage 110 or the "open valve" stage 111, the controller 41 moves to the "return from valve" stage 112.

Figure 6:
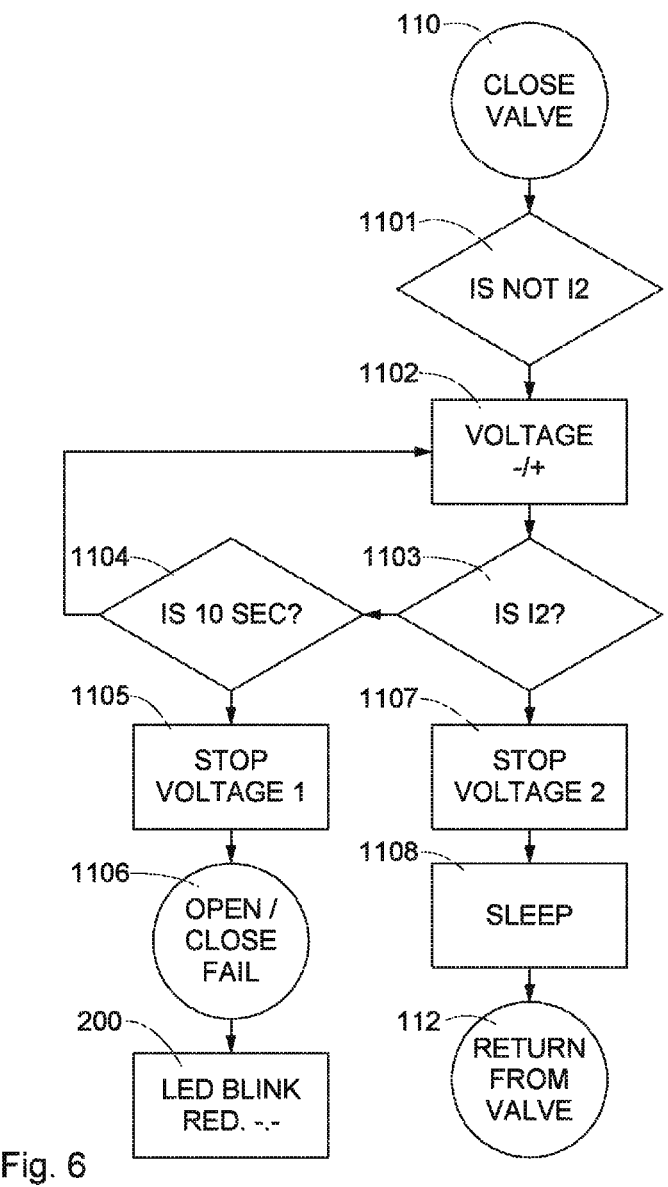
FIG. 6 is a flow chart that schematically illustrates the sub-stages of the "close valve" stage of the controller method of operation.

FIG. 6 is a flow chart that schematically illustrates the sub-stages of the "close valve" stage 110.

Upon entering the "close valve" stage 110, the controller 41 checks the status of the motorized valve 31 according to the open/close sensor I2 of the motorized valve 31 in the "is not I2" 1101 stage. If the open/close sensor I2 reports that the motorized valve 31 is in the "open" state, the control system 41 supplies the required voltage to close the motorized valve 31 in the "voltage +/−" stage 1102.

Next the controller 41 moves to the "is I2" stage 1103 in which the open/close sensor I2 is checked again to see if the motorized valve 31 has reached the "closed" state.

If the motorized valve 31 has not closed yet, the controller 41 moves to the "is 10 sec" stage 1104 in which the controller 41 checks whether a predetermined amount of time, such as 10 seconds, has passed since the start of the closing process. If not, it returns to the "voltage +/−" stage 1102. If more than the predetermined amount of time, had passed, the controller 41 moves to the "stop voltage1" stage 1105 where it stops providing the voltage to the motorized valve 31 and then it moves to the "open/close fail" stage 1106 in which the controller 41 moves to the "LED blink red" stage 200 in which it turns on the corresponding indicator 43 to indicate the open/close failure.

When the control system is in the "is I2" stage 1103 and the motorized valve 31 had closed, the controller 41 moves to the "stop voltage2" stage 1107 where the controller 41 stops providing the voltage to the motorized valve 31 and then it moves to the "sleep" stage 1108 in which the controller 41 switched to a "sleep" mode for power preservation for a predetermined period, such as 3 minutes.

Next, the controller 41 returns to the "return from valve" stage 112.

Figure 7:
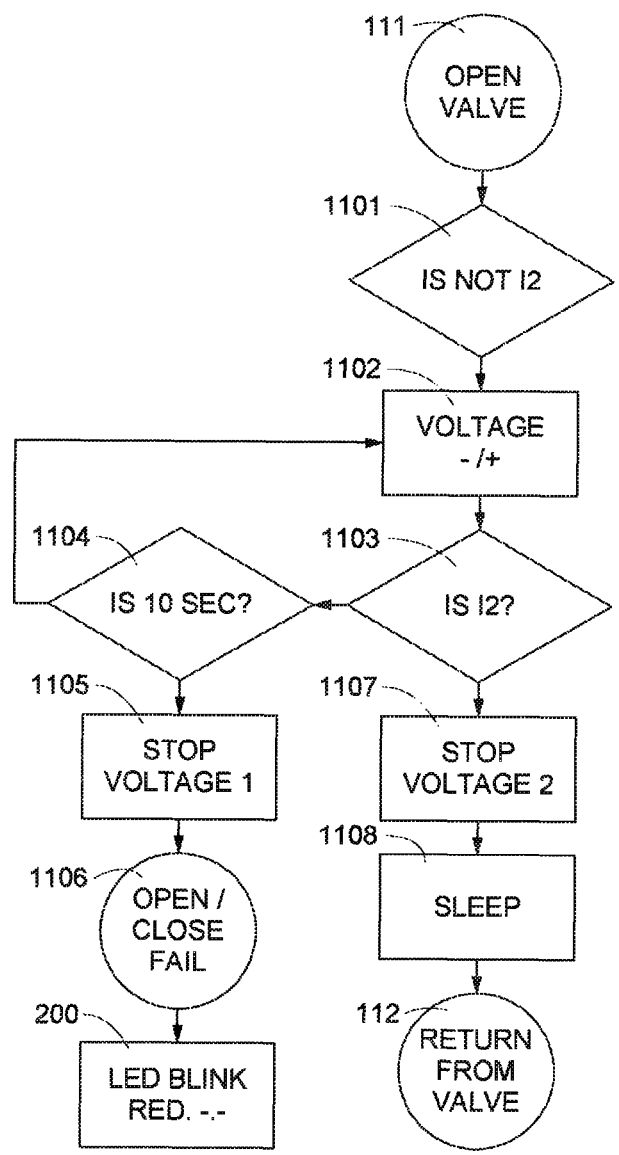
FIG. 7 is a flow chart that schematically illustrates the sub-stages of the "open valve" stage of the controller method of operation.

FIG. 7 is a flow chart that schematically illustrates the sub-stages of the "open valve" 111 stage of controller 41 method of operation.

Upon entering the "open valve" stage 111, the controller 41 checks the status of the motorized valve 31 according to the open/close sensor I2 of the motorized valve 31 in the "is not I2" 1101 stage. If the open/close sensor I2 reports that the motorized valve 31 is in the "closed" state, the controller 41 supplies the required voltage to open the motorized valve 31 in the "voltage +/−" stage 1102.

Next the controller 41 moves to the "is I2" stage 1103 in which the open/close sensor I2 is checked again to see if the motorized valve 31 has reached the "open" state.

If the motorized valve 31 has not opened yet, the controller 41 moves to the "is 10 sec" stage 1104 in which the controller 41 checks whether a predetermined amount of time, such as 10 seconds has passed since the start of the opening process. If not, it returns to the "voltage +/−" stage 1102. If more than the predetermined amount of time had passed, the control system 40 moves to the "stop voltage1" stage 1105 where it stops providing the voltage to the motorized valve 31 and then it moves to the "open/close fail" stage 1106 in which the controller 41 moves to the "LED blink red" stage 200 in which it turns on the corresponding indicator 43 to indicate the open/close failure.

When the control system is in the "is I2" stage 1103 and the motorized valve 31 had closed, the controller 41 moves to the "stop voltage2" stage 1107 where the controller 41 stops providing the voltage to the motorized valve 31 and then it moves to the "sleep" stage 1108 in which the controller 41 switched to a "sleep" mode for power preservation for a predetermined period, such as 3 minutes.

Next, the controller 41 returns to the "return from valve" stage 112.

While the invention has been described with respect to a limited number of embodiments, it will be appreciated that many variations, modifications and other applications of the invention may be made.

What is claimed is:

1. A control system for a hot water supply system, wherein the hot water supply system includes at least one boiler having a heating fluid input pipe line, the control system comprising:
   a motorized valve; installed upon said heating fluid input pipe line;
   a first thermistor installed upon said heating fluid input pipe line;
   a second thermistor installed within a thermostat housing within said boiler such that the second thermistor is located radially inward from exterior walls of the boiler and a thermostat is disposed within the thermostat housing;
   a motor mechanically connected to said motorized valve; and
   a controller, wherein said controller is adapted for opening and closing said motorized valve according to temperature difference between a temperature measurement by said first thermistor and a temperature measurement by said second thermistor, and wherein said controller is electrically connected to said motor, to said first thermistor, and to said second thermistor;

wherein said controller is connected to said motor by a control line, to said first thermistor by a first thermistor feedback line, and to said second thermistor by a second thermistor feedback line.

2. The control system of claim 1 further comprising:

a battery, wherein said battery is electrically connected to said controller.

3. The control system of claim 2 further comprising:

an indicator, wherein said indicator is electrically connected to said controller.

4. The control system of claim 1, wherein said motorized valve, when activated to close, prevents any flow through an internal heat-exchanger which is located inside said boiler.

5. The control system of claim 1, wherein said control system includes no motorized valve bypass.

6. The control system of claim 1, wherein said control system includes no signal transmitter to indicate a state of a private heating switch.

* * * * *